(12) United States Patent
Leyva et al.

(10) Patent No.: US 12,116,944 B2
(45) Date of Patent: Oct. 15, 2024

(54) METHODS AND SYSTEMS FOR EGR SYSTEM

(71) Applicant: Ford Global Technologies, LLC, Dearborn, MI (US)

(72) Inventors: Jose Francisco Martinez Leyva, Mexico City (MX); Sumanth Reddy Dadam, New Hudson, MI (US); Patrick Edward Smithberger, Marine City, MI (US); Adam Krach, Canton, MI (US); Edward Doemer, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 17/806,310

(22) Filed: Jun. 10, 2022

(65) Prior Publication Data

US 2023/0399989 A1 Dec. 14, 2023

(51) Int. Cl.
*F02D 41/00* (2006.01)
*F02M 26/47* (2016.01)

(52) U.S. Cl.
CPC ....... *F02D 41/0077* (2013.01); *F02D 41/005* (2013.01); *F02M 26/47* (2016.02); *F02D 2200/021* (2013.01); *F02D 2200/0406* (2013.01); *F02D 2200/06* (2013.01); *F02D 2200/101* (2013.01); *F02D 2200/703* (2013.01)

(58) Field of Classification Search
CPC ............... F02D 41/0077; F02D 41/005; F02D 2200/021; F02D 2200/0406; F02D 2200/06; F02D 2200/101; F02D 2200/703; F02M 26/47; Y02T 10/40
See application file for complete search history.

(56) References Cited

U.S. PATENT DOCUMENTS

| | | | |
|---|---|---|---|
| 5,515,833 A | 5/1996 | Cullen et al. | |
| 5,542,390 A | 8/1996 | Hartman et al. | |
| 6,470,866 B2 * | 10/2002 | Cook | F02D 21/08 60/605.2 |
| 6,510,746 B1 * | 1/2003 | Kotwicki | G01F 1/363 702/45 |
| 10,774,796 B2 * | 9/2020 | Haigh | F02M 26/48 |
| 2002/0129800 A1 * | 9/2002 | Russell | G01F 1/34 123/568.21 |
| 2009/0229583 A1 * | 9/2009 | Kotooka | F02M 26/48 123/188.2 |
| 2012/0290190 A1 * | 11/2012 | Kim | F02M 26/33 701/102 |
| 2017/0241364 A1 * | 8/2017 | Sczomak | F02M 26/05 |
| 2018/0058350 A1 * | 3/2018 | Zhu | F02D 41/0002 |
| 2018/0058391 A1 * | 3/2018 | Gibson | F02D 41/0077 |

(Continued)

FOREIGN PATENT DOCUMENTS

WO 2013030562 A1 3/2013

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems are provided for EGR valve diagnostic. In one example, a method includes providing a correction to a position of the EGR valve to compensate for an altitude of the vehicle. The compensation is based on a comparison of a pressure ratio to a curve rationalized with a barometric pressure.

19 Claims, 4 Drawing Sheets

(56) References Cited

U.S. PATENT DOCUMENTS

2018/0274471 A1\* 9/2018 Dudar ................. G01M 15/042
2019/0024574 A1\* 1/2019 Upadhyay ............. F04D 29/685
2019/0257254 A1\* 8/2019 Obeng ................... F02M 26/02
2021/0215111 A1\* 7/2021 Keating ............. F02D 41/0002

\* cited by examiner

METHODS AND SYSTEMS FOR EGR SYSTEM

FIELD

The present description relates generally to diagnosing an exhaust-gas recirculation (EGR) valve of an EGR system.

BACKGROUND/SUMMARY

Engine systems may utilize recirculation of exhaust gas from an engine exhaust system to an engine intake system, a process referred to as exhaust gas recirculation (EGR), to reduce regulated emissions. An EGR valve may be controlled to achieve a desired intake air dilution for a given engine operating condition. The amount of low pressure EGR (LP-EGR) and/or high pressure EGR (HP-EGR) routed through the EGR system may be measured and adjusted based on engine speed, engine temperature, and load during engine operation to maintain desirable combustion stability of the engine while providing emissions and fuel economy benefits. EGR effectively cools combustion chamber temperatures thereby reducing NO formation.

EGR delivery may be measured via a fixed orifice and a pressure drop sensed across the orifice. The orifice pressure drop may be measured by a differential pressure sensor or two discrete pressure sensors, one on each side of the orifice. An orifice EGR flow measurement may be possible via characterizing a relationship between flow and the orifice pressure drop. The relationship may be stored in memory and retrieved during future EGR flow conditions to adjust EGR measured flow rate. The EGR measured flow rate can then be used by a controller to adjust at least one of an engine airflow, an in-cylinder fuel/air mixture burn rate, an engine output torque, and as a feedback signal in a closed loop EGR flow controller configuration, in which EGR flow is regulated by a valve separate from the fixed orifice.

During some conditions, a selected EGR valve position may not provide a desired amount of EGR due to changes in barometric pressure (BP). Thus, a position sensor of the EGR valve may not diagnose the unwanted EGR flow rate. Diagnostics for the delta-pressure over the valve may not account of changes in altitude or weather that may impact the BP.

In one example, the issues described above may be addressed by a method of altitude compensation of a delta pressure over the valve (DPOV) EGR system by adjusting a valve controlling flow through the EGR system by providing a correction to a position of the EGR valve based on a pressure ratio normalized to a manifold air pressure (MAP) and a barometric pressure (BP). In this way, the EGR valve position may be corrected at various altitudes using the same diagnostic.

As an example, when EGR is demanded, the EGR valve may be commanded to a desired lift (e.g., desired degree of opening position). Altitude changes may impact EGR supply to the intake due to changes in BP. By accounting for BP in diagnosing the position of the EGR valve, more accurate EGR supply may be realized across a wider range of altitudes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
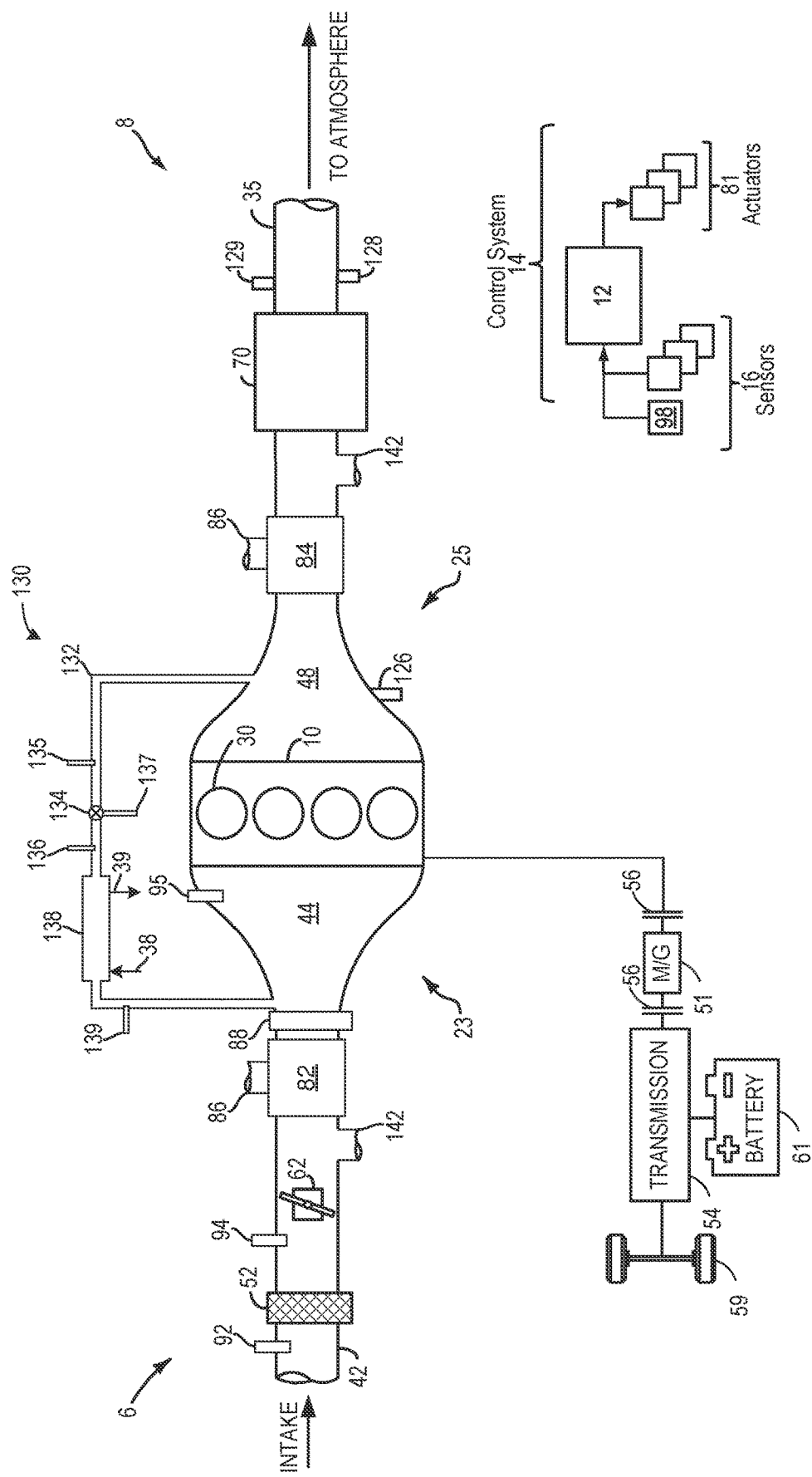
FIG. 1 illustrates a schematic of an engine included in a hybrid vehicle.
Figure 2:
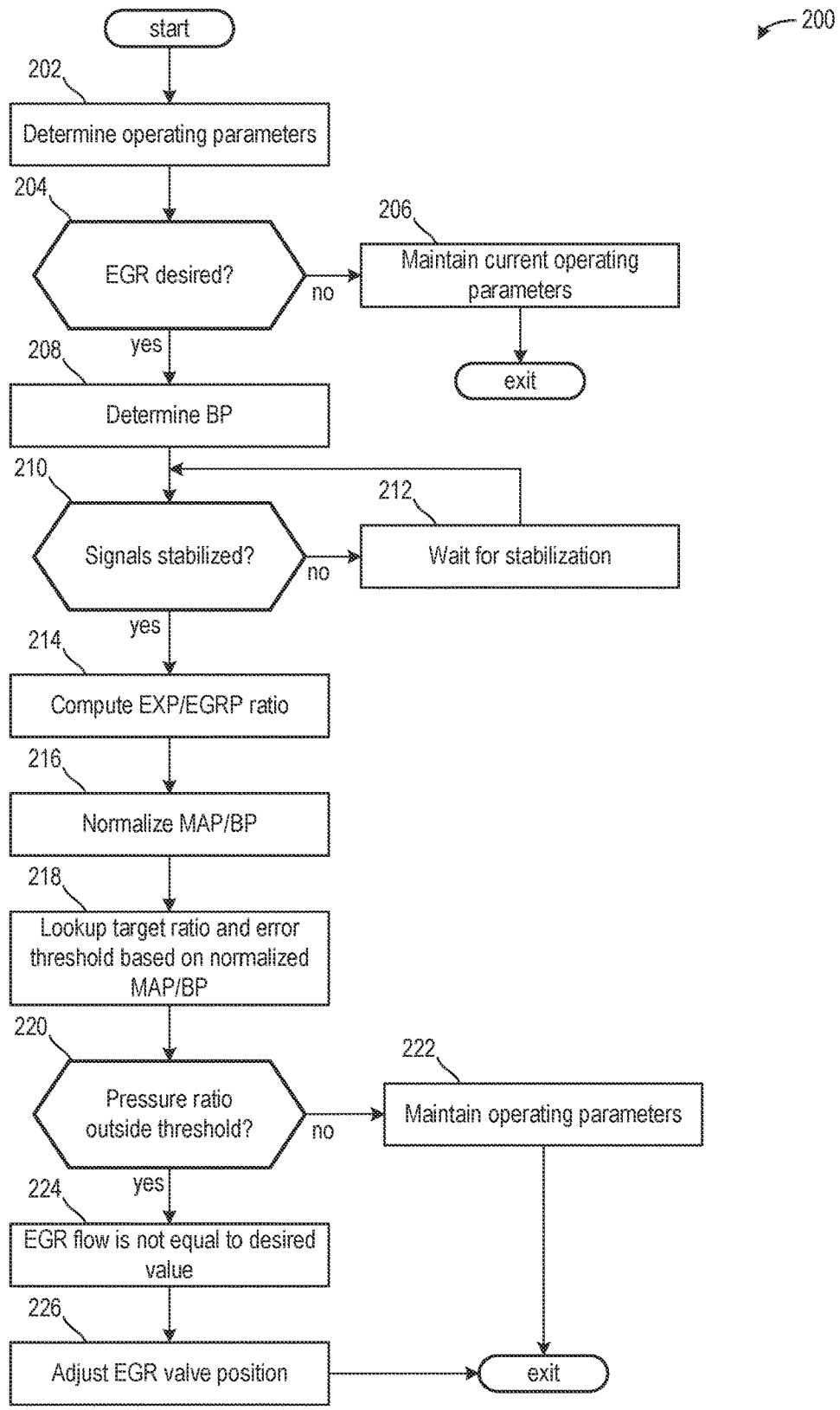
FIG. 2 illustrates a method for comparing a pressure ratio to a MAP/BP curve to diagnose an EGR supply.
Figure 3:
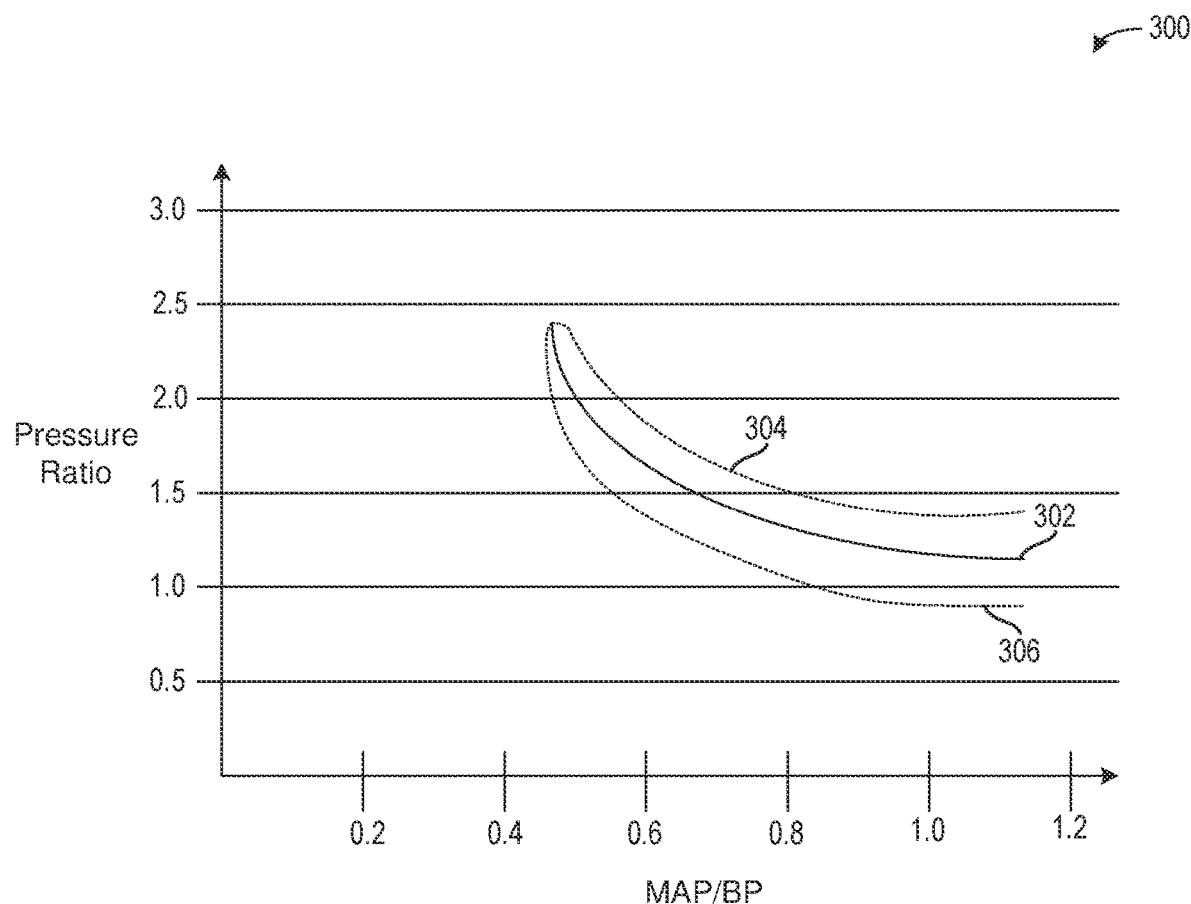
FIG. 3 illustrates the MAP/BP curve along with a threshold range of the pressure ratio.
Figure 4:
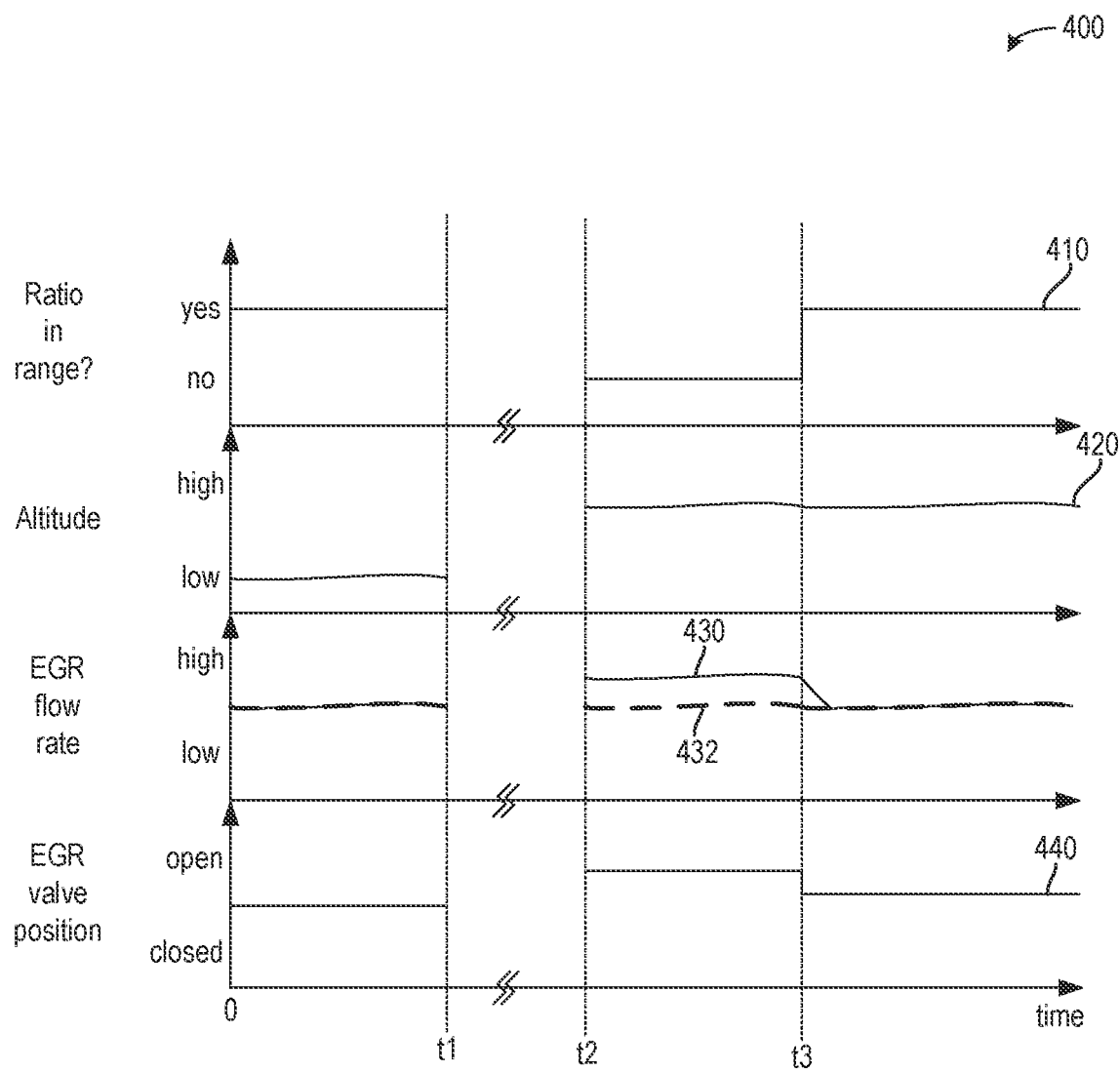
FIG. 4 shows a graph illustrating calibrating an EGR valve position in response to a pressure ratio and an altitude at which a vehicle is operating.

The following description relates to systems and methods for diagnosing an EGR valve. The EGR valve may be configured to open and close in response to commands from a controller proportional to an EGR request. The EGR may flow from an exhaust passage, coupled to an engine, to an intake passage or an intake manifold coupled to the engine. An example of the engine is illustrated in FIG. 1. BP changes due to altitude may affect an EGR supply rate. Thus, it may be desired to calibrate an EGR valve position to a given altitude. A method for diagnosing the EGR valve position based on a comparison of a ratio of exhaust pressure and EGR pressure to a curve of MAP/BP is shown in FIG. 2. FIG. 3 illustrates the curve of the MAP/BP along with a threshold range of the ratio relative to the curve. FIG. 4 illustrates a graph for calibrating the EGR valve in response to a pressure ratio and altitude.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. The engine intake manifold 44 may further comprise a manifold absolute pressure (MAP) sensor 95. Engine exhaust 25 includes an exhaust manifold 48 leading to an exhaust passage 35 that routes exhaust gas to the atmosphere. Engine exhaust 25 may include at least one emission control device 70 mounted in a close-coupled position or in a far underbody position. The emission control device 70 may include a three-way catalyst, lean NOx trap, particulate filter, oxidation catalyst, etc. It will be appreciated that other components may be included in the engine such as a variety of valves and sensors, as further elaborated in herein.

In the example of the present disclosure, the emission control device 70 is a particulate filter 70. In one example, the particulate filter 70 is a gasoline particulate filter. In another example, the particulate filter 70 is a diesel particulate filter.

The engine system 8 further comprises a turbocharger having a compressor 82 and a turbine 84. The compressor 82 and the turbine 84 are mechanically coupled via a shaft 86. The turbine 84 may be driven via exhaust gases flowing through the exhaust passage 35. The exhaust gases may rotate a rotor of the turbine 84, which may rotate the shaft 86, resulting in rotation of a rotor of the compressor 82. The compressor 82 is configured to receive and compress intake air. In some examples, the intake may further comprise a charge-air-cooler (CAC) 88 arranged downstream of the compressor 82. In one example, the CAC 88 may be a liquid to air or air to air cooler configured to cool a temperature of gases flowing therethrough.

The engine system 8 further comprises an exhaust-gas recirculation (EGR) system 130. In the example of FIG. 1, the EGR system 130 is a high-pressure EGR system where exhaust gases are drawn from a location of the engine exhaust 25 upstream of the turbine 84. The EGR system 130 comprises an EGR valve 134 arranged upstream of a heat exchanger 138, relative to a direction of exhaust gas flow in an EGR passage 132.

The EGR system 130 further comprises a first pressure sensor 135, herein, referred to as an exhaust pressure sensor 135, a second pressure sensor 136, herein, referred to as an EGR pressure sensor 136, and a temperature sensor 139. The exhaust pressure sensor 135 may be arranged upstream of the EGR valve 134 and the EGR pressure sensor 136 may be arranged downstream of the EGR valve, relative to a direction of exhaust gas flow. The temperature sensor 139 may be arranged downstream of the heat exchanger 138. Each of the exhaust pressure sensor 135, the EGR pressure sensor 136, and the temperature sensor 139 may be configured to provide feedback to a controller 12. As illustrated, the EGR system 130 is a high-pressure EGR system free of a fixed orifice delta pressure sensor. In one example, the EGR system 130 is a delta pressure over valve (DPOV) EGR system 130, wherein the delta pressure is determined via feedback from the exhaust pressure sensor 135 and the EGR pressure sensor 136.

An EGR valve position sensor 137 may be configured to provide feedback to the controller 12 with regard to a position of the EGR valve 134. In some examples, an accuracy of the EGR valve position sensor 137 may degrade due to changes in barometric pressure (BP), which may be due to altitude and/or weather. During some conditions, the exhaust pressure sensor 135 and the EGR pressure sensor 136 may be used to generate a pressure ratio. The pressure ratio may be compared to a curve normalized to BP, to determine if a current EGR supply matches a desired/requested EGR supply. The position of the EGR valve 134 may be corrected if the current EGR supply does not match the desired EGR supply.

In one example, the heat exchanger 138 may be a liquid-to-liquid or an air-to-liquid cooler. The heat exchanger 138 may be configured to receive coolant from a cooling system of the hybrid vehicle 6, such as an engine cooling system or other similar cooling system via an inlet 38. An outlet 39 may expel coolant from the heat exchanger 138 to a radiator or other portion of the cooling system. Additionally or alternatively, the heat exchanger 138 may comprise a cooling system separate from other cooling system of the hybrid vehicle 6. In some examples, a bypass passage may be included in the EGR system 130, wherein the bypass passage is configured to flow pressurized exhaust gases around the heat exchanger 138 during conditions where cooling may not be desired. In one example, cooling may not be desired during conditions where an engine temperature is less than a desired temperature, such as during a cold-start.

In the example of FIG. 1, the hybrid vehicle 6 further comprises a low-pressure (LP) EGR passage 142. The LP-EGR passage 142 is configured to divert exhaust gases from downstream of the turbine 84 to a portion of the intake passage 42 upstream of the compressor 82. Additionally or alternatively, in some examples, the hybrid vehicle 6 may be configured without the LP-EGR passage 142 without departing from the scope of the present disclosure.

Hybrid vehicle 6 may further include control system 14. Control system 14 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of the emission control device 70, a temperature sensor 128, and a pressure sensor 129. The sensors 16 may further include a barometric pressure (BP) sensor (e.g., a barometer) 98. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and the electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows a method 200 for diagnosing a position of an EGR valve in response to a comparison of a ratio to a threshold error range. The ratio may include a ratio of an exhaust gas pressure (EXP) and an EGR pressure (EGRP). The threshold error range may be based on a curve of a manifold air pressure (MAP)/barometric pressure (BP). By comparing the ratio to the threshold error range based on the curve of MAP/BP, selected EGR valve positions may be more accurate at a greater range of altitudes. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 200 begins at 202, which includes determining, estimating, and/or measuring current operating parameters. Current operating parameters may include, but are not limited to, one or more of a manifold pressure, a throttle position, an engine speed, an engine temperature, a vehicle speed, and an air/fuel ratio.

At 204, the method 200 may include determining if EGR is desired. EGR may be desired in response to one or more of the engine temperature and an emission amount. For example, EGR may be desired if the engine temperature is relatively high (e.g., greater than a determined temperature). As another example, EGR may be desired if the emission amount is greater than a determined amount. The determined amount may be based on a government standard. Additionally or alternatively, the determined amount may be equal to a manufacturer target emission value or other value. In one example, the emission amount is based on an amount of NO generated.

If EGR is not desired, then at 206, the method 200 may include maintaining current operating parameters. In one example, the EGR valve position is not diagnosed when EGR is not desired.

If EGR is desired, then at 208, the method 200 may include determining a BP. The BP may be determined via feedback from a weather service, an application, or an Internet service. Additionally or alternatively, the BP may be determined via a sensor coupled to the controller of the vehicle (e.g., the barometer 98 of FIG. 1).

At 210, the method 200 may include determining if signals of an EXP sensor and an EGRP sensor (collectively referred to herein as "the pressure sensors") are stabilized. In one example, the signals may not be stabilized if a transient event or other similar event is occurring and pressure values are changing at greater than a determined rate. If the values of the exhaust pressure sensor and the EGR pressure sensor are relatively constant (e.g., changing at less than or equal to the determined rate), it may be determined that the signals are stabilized. Additionally or alternatively, stabilization may be estimated based on current operating conditions. For example, if operating conditions are constant for a determined duration (e.g., 2 seconds), then the signals, and therefore the respective pressure sensors, may be stabilized.

If signals of the pressure sensors are not stabilized, then at 212, the method 200 may include waiting for stabilization. Feedback from the pressure sensors may be sampled at a determined rate until signal stabilization is reached. Additionally or alternatively, waiting for stabilization may include waiting the determined duration for operating conditions to remain unchanged.

At 214, the method 200 may include computing an EXP:EGRP ratio. The ratio may be computed for a range of valve positions, wherein the ratio may converge toward 1 at larger EGR valve lifts. As described above, a larger lift may correspond to a more open position of the EGR valve, thereby flowing a greater amount of EGR toward the intake passage.

At 216, the method 200 may include normalizing a MAP to BP. The normalization may be used to predict expected EXP:EGRP ratios for a variety of valve lifts (as shown in FIG. 3).

At 218, the method 200 may include looking up a target ratio and error threshold based on the normalized MAP/BP. The error threshold may be a range based on a curve, wherein values within the range are equal to the target ratio. Values outside the range may not be equal to the target ratio. The curve may be based on the EXP:EGRP normalized to the MAP/BP. An example of the curve and the error threshold range is shown in FIG. 3.

At 220, the method 200 may include determining if the pressure ratio (e.g., EXP:EGRP) is outside the error threshold range. If the pressure ratio is not outside the error threshold range (e.g., equal to a desired pressure ratio value), then at 222, the method 200 may include maintaining operating parameters. In one example, an amount of EGR delivered to the engine is equal to an expected amount. As such, a position of the EGR valve is not adjusted at a current altitude and/or a current BP.

If the pressure ratio is outside the error threshold range, then at 224, the method 200 may include determining that an EGR flow is not equal to a desired value.

At 226, the method 200 may include adjusting an EGR valve position. In one example, a magnitude of adjusting the EGR valve position may be proportional to a difference between the measured pressure ratio and the desired pressure ratio. For example, if the difference is a negative value, then EGR flow may be less than a desired value and a valve lift of the EGR valve may be increased at a given altitude. If the difference is a positive value, then EGR flow may be greater than a desired value and a valve lift may be decreased at a given altitude. In one embodiment, the current valve position may be adjusted at the given altitude and respective BP? during current operating conditions and may be automatically adjusted at the given altitude during future operating conditions where a similar amount of EGR is requested. In other words, a desired EGR valve position may be updated to reflect the determined valve position at the given altitude.

In one example, a position of the EGR valve may be updated in a multi-input look-up table. The position, which may be associated with various other conditions including MAP, BP, engine speed, engine temperature, vehicle fueling, air/fuel ratio, vehicle speed, requested EGR, location, and the like, may be updated to include the correction in the multi-input look-up table. By doing this, other positions of the EGR valve may not be adjusted in response to the determined correction. Thus, for future operating conditions at a given BP or a given altitude, the position of the EGR valve may be adjusted to the corrected/updated position. The diagnostic of FIG. 2 may be the same diagnostic used at various altitudes and BPs. In this way, the diagnostic of FIG. 2 may rationalize the EGRP sensor, and therefore correct an EGR valve position during different weather and altitude conditions.

Turning now to FIG. 3, it shows a graph 300 illustrating a curve 302. The curve 302 may represent the EXP:EGRP ratio, labeled on the ordinate, rationalized to MAP/BP, labeled on the abscissa. As illustrated, the curve 302 may be based on a quadratic function.

An error threshold range may be determined based on the curve 302. Upper curve 304 may represent an upper bound of the error threshold range and lower curve 306 may represent a lower bound of the error threshold range. Values outside of the error threshold range (e.g., above the upper curve 304 or below the lower curve 306) may indicate a current EGR flow rate is not equal to a desired EGR flow rate at a given altitude. For example, a current pressure ratio may be compared to the error threshold range of the curve 302 to determine if a current EGR supply matches a desired EGR supply. Thus, to correct the EGR flow rate, a position (e.g., a lift of an opening) of an EGR valve may be adjusted. Values within the error threshold range may indicate the current EGR flow rate is equal to the desired EGR flow rate, and the EGR valve position may be maintained.

Turning now to FIG. 4, it shows a graph 400 illustrating changes to operating conditions in response to an EGR valve position diagnosis. Plot 410 illustrates if a current ratio is within the error threshold range. Plot 420 illustrates an altitude. Plot 430 illustrates a current EGR flow rate and plot 432 illustrates a desired EGR flow rate. Plot 440 illustrates a current EGR valve position. Plot 430 may track plot 432 when the current EGR flow rate and the desired EGR flow rate are equal. Time increases from a left to a right side of the figure.

Prior to t1, the altitude is relatively low (plot 420). The ratio is within the error threshold range (plot 410) based on the curve generated by plotting EXP:EGRP against MAP/BP, as illustrated in FIG. 3. As such, the current EGR flow rate (plot 430) is equal to the desired EGR flow rate (plot 432) at a current EGR valve position (plot 440). The EGR valve position is not adjusted. Additionally or alternatively, a multi-input look-up table with EGR valve positions stored along with operating inputs may not be updated.

Between t1 and t2, some amount of time passes. At t2, the vehicle is at a relatively high altitude. In one example, the BP at the high altitude may be less than the BP at the lower altitude. The ratio is not within the error threshold range. Between t2 and t3, the current EGR flow rate is not equal to the desired EGR flow rate. In the example of FIG. 4, the current EGR flow rate is greater than the desired EGR flow rate. At t3, the EGR valve is adjusted to a more closed position. In one example, the valve lift may be reduced relative to a previous position, thereby decreasing the EGR flow rate. After t3, the ratio is within the error threshold range. As such, the EGR flow rate is equal to the desired EGR flow rate at the adjusted EGR valve position. In one example, the multi-input look-up table may be updated to include the adjusted EGR valve position as a desired EGR valve position in combination with other current operating conditions (e.g., throttle position, engine speed, engine temperature, fuel rate, and the like).

The technical effect of normalizing the ratio of EXP: EGRP to MAP/BP is to calibrate EGR valve positions during a variety of operating conditions at different altitudes. By doing this, a desired amount of EGR may be provided during a greater range of engine operating conditions. This may decrease emissions and improve efficiency.

The disclosure provides support for a method of altitude compensation of a delta pressure over valve (DPOV) exhaust gas recirculation (EGR) system including providing a correction to a position of an EGR valve based on a pressure ratio normalized to a manifold air pressure (MAP) and a barometric pressure (BP). A first example of the method further includes where the DPOV is sensed via an exhaust gas pressure (EXP) sensor and an EGR pressure (EGRP) sensor, the EXP positioned upstream of the EGR valve and the EGRP positioned downstream of the EGR valve relative to a direction of exhaust gas flow. A second example of the method, optionally including the first example, further includes providing the correction factor at various altitudes using the pressure ratio normalized to the MAP and the BP. A third example of the method, optionally including one or more of the previous examples, further includes where the pressure ratio is based on an EXP and a EGRP. A fourth example of the method, optionally including one or more of the previous examples, further includes generating a curve based on the pressure ratio normalized to MAP and BP. A fifth example of the method, optionally including one or more of the previous examples, further includes where the correction is provided in response to a current pressure ratio being outside a threshold error range based on the curve. A sixth example of the method, optionally including one or more of the previous examples, further includes updating the position of the EGR valve in a multi-input look-up table for only a current altitude and engine operating conditions. A seventh example of the method, optionally including one or more of the previous examples, further includes maintaining the position of the EGR valve in response to a current pressure ratio being within a threshold error range based on the curve.

The disclosure further provides support for a system including a delta pressure over valve (DPOV) exhaust gas recirculation (EGR) system comprising a first pressure sensor arranged upstream of an EGR valve and a second pressure sensor arranged downstream of the EGR valve relative to a direction of exhaust gas flow; and a controller with computer-readable instructions stored on memory thereof that when executed cause the controller to sense a current pressure ratio based on a current exhaust gas pressure (EXP) and a current EGR pressure (EGRP), and compare the current pressure ratio to an error threshold range based on a curve, wherein the curve represents a relationship of a ratio of EXP:EGRP normalized to a manifold air pressure (MAP)/a barometric pressure (BP) and provide a correction to a position of the EGR valve at a given altitude in response to the current pressure ratio being outside the error threshold range. A first example of the system further includes where the correction is only applied at the given altitude in combination with one or more engine operating parameters including a throttle position, an engine speed, an engine temperature, and a fuel rate. A second example of the system, optionally including the first example, further includes where the instructions further enable the controller to maintain the position of the EGR valve at the given altitude in response to the current pressure ratio being inside the error threshold range. A third example of the system optionally including one or more of the previous examples, further includes where the correction comprises moving the position of the EGR valve to a more open position in response to the current pressure ratio being less than a lower bound of the error threshold range. A fourth example of the system optionally including one or more of the previous examples, further includes where the correction comprises moving the position of the EGR valve to a less open position in response to the current pressure ratio being greater than an upper bound of the error threshold range. A fifth example of the system optionally including one or more of the previous examples, further includes where the instructions further enable the controller to provide a correction at various altitudes using the same comparison of a current pressure ratio to the error threshold range based on the curve. A sixth example of the system optionally including one or more of the previous examples, further includes where the EXP is sensed via the first pressure sensor and the EGRP is sensed via the second pressure sensor.

The disclosure further provides support for a method for a delta pressure over valve (DPOV) exhaust gas recirculation (EGR) system comprising a first pressure sensor arranged upstream of an EGR valve and a second pressure sensor arranged downstream of the EGR valve relative to a direction of exhaust gas flow, the method including generating a curve based on a normalization of a ratio of exhaust gas pressure (EXP):EGR pressure (EGRP) to a manifold air pressure (MAP)/a barometric pressure (BP), comparing a current ratio of EXP:EGRP to the curve at a current altitude, and providing a correction to a position of the EGR valve in response to the current ratio being outside an error threshold range of the curve. A first example of the method further includes only providing the correction at the current altitude, further comprising providing other corrections to the position of the EGR valve at other altitudes in response to ratios of EXP:EGRP thereof being outside the error threshold range. A second example of the method, optionally including the first example, further includes updating the position of the EGR valve in a look-up table in combination with a plurality of inputs, wherein the plurality of inputs comprises MAP, altitude, engine fueling, and vehicle speed. A third example of the method optionally including one or more of the previous examples, further includes maintaining the position of the EGR valve in response to the current ratio being within the error threshold range. A fourth example of the method optionally including one or more of the previous examples, further includes where the error threshold range comprising an upper bound and a lower bound spaced about the curve, and wherein the curve is based on a quadratic function.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of altitude compensation of a delta pressure over valve (DPOV) exhaust gas recirculation (EGR) system, comprising:
  adjusting a valve controlling flow through the EGR system by providing a correction to a position of the EGR valve based on a pressure ratio normalized to a manifold air pressure (MAP) and a barometric pressure (BP),
  wherein the DPOV is sensed via an exhaust gas pressure (EXP) sensor and an EGR pressure (EGRP) sensor, the EXP positioned upstream of the EGR valve and the EGRP positioned downstream of the EGR valve relative to a direction of exhaust gas flow.

2. The method of claim 1, further comprising providing the correction at various altitudes using the pressure ratio normalized to the MAP and the BP.

3. The method of claim 1, wherein the pressure ratio is based on an EXP and a EGRP.

4. The method of claim 1, further comprising generating a curve based on the pressure ratio normalized to MAP and BP.

5. The method of claim 4, wherein the correction is provided in response to a current pressure ratio being outside a threshold error range based on the curve.

6. The method of claim 5, further comprising updating the position of the EGR valve in a multi-input look-up table for only a current altitude and engine operating conditions.

7. The method of claim 4, further comprising maintaining the position of the EGR valve in response to a current pressure ratio being within a threshold error range based on the curve.

8. A system, comprising:
a delta pressure over valve (DPOV) exhaust gas recirculation (EGR) system comprising a first pressure sensor arranged upstream of an EGR valve and a second pressure sensor arranged downstream of the EGR valve relative to a direction of exhaust gas flow; and
a controller with computer-readable instructions stored on memory thereof that when executed cause the controller to:
sense a current pressure ratio based on a current exhaust gas pressure (EXP) and a current EGR pressure (EGRP); and
compare the current pressure ratio to an error threshold range based on a curve, wherein the curve represents a relationship of a ratio of EXP:EGRP normalized to a manifold air pressure (MAP)/a barometric pressure (BP); and
provide a correction to a position of the EGR valve at a given altitude in response to the current pressure ratio being outside the error threshold range.

9. The system of claim 8, wherein the correction is only applied at the given altitude in combination with one or more engine operating parameters including a throttle position, an engine speed, an engine temperature, and a fuel rate.

10. The system of claim 8, wherein the instructions further enable the controller to maintain the position of the EGR valve at the given altitude in response to the current pressure ratio being inside the error threshold range.

11. The system of claim 8, wherein the correction comprises moving the position of the EGR valve to a more open position in response to the current pressure ratio being less than a lower bound of the error threshold range.

12. The system of claim 8, wherein the correction comprises moving the position of the EGR valve to a less open position in response to the current pressure ratio being greater than an upper bound of the error threshold range.

13. The system of claim 8, wherein the instructions further enable the controller to provide a correction at various altitudes using the same comparison of a current pressure ratio to the error threshold range based on the curve.

14. The system of claim 8, wherein the EXP is sensed via the first pressure sensor and the EGRP is sensed via the second pressure sensor.

15. A method for a delta pressure over valve (DPOV) exhaust gas recirculation (EGR) system comprising a first pressure sensor arranged upstream of an EGR valve and a second pressure sensor arranged downstream of the EGR valve relative to a direction of exhaust gas flow, the method, comprising:
generating a curve based on a normalization of a ratio of exhaust gas pressure (EXP):EGR pressure (EGRP) to a manifold air pressure (MAP)/a barometric pressure (BP);
comparing a current ratio of EXP:EGRP to the curve at a current altitude; and
providing a correction to a position of the EGR valve in response to the current ratio being outside an error threshold range of the curve.

16. The method of claim 15, further comprising only providing the correction at the current altitude, further comprising providing other corrections to the position of the EGR valve at other altitudes in response to ratios of EXP:EGRP thereof being outside the error threshold range.

17. The method of claim 15, further comprising updating the position of the EGR valve in a look-up table in combination with a plurality of inputs, wherein the plurality of inputs comprises MAP, altitude, engine fueling, and vehicle speed.

18. The method of claim 15, further comprising maintaining the position of the EGR valve in response to the current ratio being within the error threshold range.

19. The method of claim 15, wherein the error threshold range comprising an upper bound and a lower bound spaced about the curve, and wherein the curve is based on a quadratic function.

* * * * *